United States Patent [19]

Fletcher et al.

[11] 3,729,129

[45] Apr. 24, 1973

[54] NUMERICAL COMPUTER PERIPHERAL INTERACTIVE DEVICE WITH MANUAL CONTROLS

[76] Inventors: James C. Fletcher, Administrator of the National Aeronautics and Space Administration, with respect to an invention of; Arthur I. Zygielbaum, 115 S. Monterey Street No. 4, Alhambra, Calif. 91801; Stanley S. Brokl, 728 Orange Grove No. 1, Pasadena, Calif. 91105

[22] Filed: June 22, 1971

[21] Appl. No.: 155,565

[52] U.S. Cl. ...........235/10.2, 235/92 R, 235/92 CV, 235/92 EV, 235/92 EA, 235/151.27, 235/92 DN

[51] Int. Cl. ..............................................G06m 3/14

[58] Field of Search....................235/92 CV, 92 DN , 235/92 MT; 35/151.27, 10.2

[56] References Cited

UNITED STATES PATENTS

| | | | |
|---|---|---|---|
| 3,337,723 | 8/1967 | Etnyre | 235/92 CV |
| 2,687,580 | 8/1954 | Dehmel | 35/10.2 |

*Primary Examiner*—Maynard R. Wilbur
*Assistant Examiner*—Robert F. Gnuse
*Attorney*—Monte F. Mott et al.

[57] ABSTRACT

A computer peripheral device is disclosed which includes a joystick whose displacement from a center position along two axes X and Y in either a plus (+) or a minus (−) direction is sensed. The displacement magnitude in either direction controls the rate of clock pulses provided by a variable frequency clock. The clock pulses from the two clocks are accumulated in two separate counters, whose contents are displayed. The contents of the counters are suppliable to a computer to update the contents of specific cells which define the position of a cursor on a display which is under computer control.

3 Claims, 2 Drawing Figures

Patented April 24, 1973 3,729,129

ARTHUR I. ZYGIELBAUM
STANLEY S. BROKL
*INVENTORS*

BY [signature]
[signature]
ATTORNEYS

NUMERICAL COMPUTER PERIPHERAL INTERACTIVE DEVICE WITH MANUAL CONTROLS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

The present invention is directed to computer peripheral circuitry and, more particularly, to a device which facilitates interaction between an operator and data in a computer central processor, which may be used to control the position of a light dot cursor on a display.

2. Description of the Prior Art

Many present day data display systems employ some means of identifying or designating specific points of the display data. Quite often these means consist of a light dot cursor which is movable on the display to a desired point. When the display system is under computer control, the cursor's position is often controlled by the computer. The position typically in Cartesian (XY) coordinates, is controlled by the computer by supplying the display with two numbers from selected computer storage cells which control the cursor's position along X and Y axes with respect to a chosen reference point. The cursor's position is changeable from one point to another by changing the numbers stored in the particular storage cells. This is generally accomplished as part of the computer's program or by supplying the computer with external signals from a peripheral device which is generally controllable by an operator. It is desirable that such a device be reliable, relatively simple to minimize cost and maintenance problems, and one which enables the operator to vary the numerical contents of the storage cells accurately and speedily in order to insure speedy, yet accurate cursor positioning.

OBJECTS AND SUMMARY OF THE INVENTION

It is a primary object of the present invention to provide a new computer peripheral device.

Another object of the present invention is to provide a new computer peripheral device for use with a computer to control the position of a cursor on a display under computer control.

A further object of the present invention is to provide a new device for controlling the position of an indicium with respect to a reference point.

Still another object of the invention is to provide a new, relatively simple, highly reliable computer peripheral device for displaying and varying the contents of selected computer memory storage cells.

These and other objects of the invention are achieved by providing a peripheral device consisting of a manual control, such as a joystick, whose position in two axes, e.g., X and Y, with respect to a reference position controls the frequencies of two variable frequency clocks, whose outputs or clock pulses are supplied to two up-down counters or data registers. The contents of the two counters are displayed on displays which form part of the novel device. The contents are also suppliable to a computer for varying the numbers stored in the particular storage cells whose outputs are in turn used to control cursor position on a display. As will be pointed out hereafter, the novel peripheral device may be operated to receive data from the computer, temporarily store them in its counters and display them on the device's displays. Then the contents of the counters may be changed at variable rates by controlling the position of the joystick, and thereafter the updated or changed contents of the counters may be transferred back to the computer.

The novel features of the invention are set forth with particularity in the appended claims. The invention will best be understood from the following description when read in conjunction with the accompanying drawings.

DESCRIPTION OF THE PREFERRED EMBODIMENTS

As seen from the figures, the peripheral device of the present invention, designated by numeral 10 includes a joystick 12. The displacement of the joystick 12 from the center in either direction (+ or −) in either of two orthogonal axes X and Y is sensed by position sensors 14. The displacements in the X and Y axes are used to control variable frequency clocks (VFC) 20X and 20Y respectively. The clock pulse rates from VFC 20X and 20Y are directly related to the displacement of the joystick 12 from the center in the X and Y axes, respectively.

Figure 2:
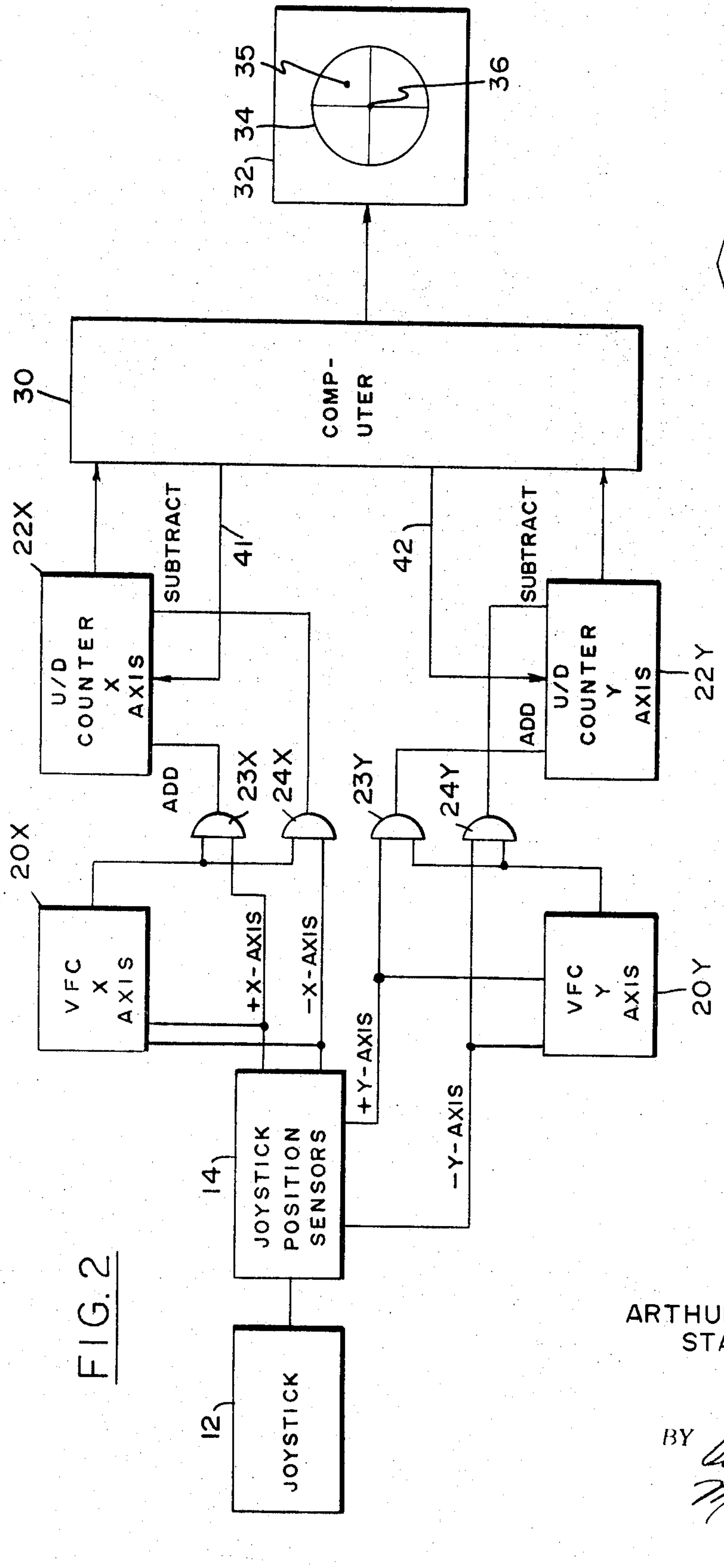
FIG. 2 is a block diagram of the device in conjunction with a computer controlled display.

As seen from FIG. 2, the device 10 also includes two data registers in the form of two up-down counters 22X and 22Y. The two counters are identical. In operation the count in counter 22X changes whenever the joystick is displaced in the X axis. The count is incremented by the clock pulses from 20X when the displacement is in the plus (+X) direction, while being decremented if the displacement is in the negative (−X) direction. However, the rate of count change depends on the displacement magnitude since the frequency of the clock pulses from VFC 20X depends on the displacement magnitude. Such an operation may be easily implemented by a pair of AND gates 23X and 24X which are respectively enabled when the joystick is in the +X or −X direction to enable the clock pulses from VFC 20X to be supplied to counter 22X.

Counter 22X may include a sign bit, which is set to a plus (+) state when the counter is in an all zero state and the joystick is displaced in the +X direction. The same bit is set to a minus (−) state when the counter reaches an all zero state and the joystick is in the −X direction. Another pair of gates 23Y and 24Y which are identical with gates 23X and 24X are employed to control the count in counter 22Y as a function of joystick position in the Y axis.

Figure 1:
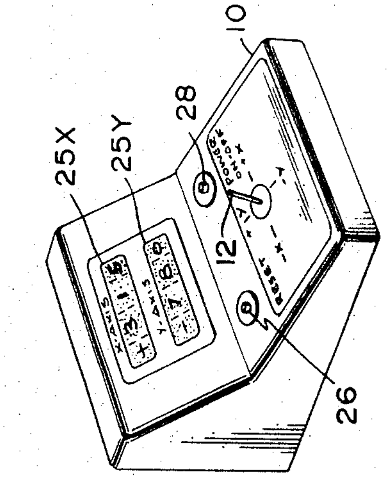
FIG. 1 is an isometric view of the device of the present invention.

As seen from FIG. 1, the device 10 further includes a pair of displays 25X and 25Y which are connected to, and display the numerical contents and the sign bits of counters 22X and 22Y, respectively. In FIG. 1 each display is shown consisting of a three-digit and sign unit. Thus the contents of the counters are conveniently displayable to the operator. Once the joystick is returned to its center position, the contents of the two counters remain constant. The device 10 is provided with a REST button 26 to enable the operator to reset both counters to an all zero state. A power ON/OFF button 28 is also provided to control the supply of power to the various circuits of the device.

From the foregoing it should be appreciated that in the present device 10, the content of either or both counters can be easily changed at a variable rather than a fixed rate, which depends on joystick displacement from its center. This enables an operator to control the content of either counter speedily and accurately. For example, to store a count of +315 in counter 22X, the operator may fully displace joystick 12 to the right in the +X direction. This causes the count to increment at a maximum rate. Then as the count approaches +315, the joystick is gradually returned to its center. As a result the clock pulse rate decreases so that when the joystick reaches the center, the exact count +315 is achieved. If the count exceeds that value it is decrementable by deflecting the joystick to the left along the −X axis. Similarly, a count of −780 may be stored in counter 22Y by displacing the joystick in the −Y axis.

In FIG. 2, the outputs of counters 22X and 22Y are shown supplied to a computer 30 which is assumed to control a display unit 32 with a display 34. The computer 30 is further assumed to control the position of a cursor 35 on the display 34 with respect to a center reference point 36, as a function of the numbers in two specific memory cells of the computer. In operation, the contents of the counters 22X and 22Y are used to update or vary the contents of the two cells and thereby control the cursor's position on display 34. It is appreciated that since the contents of the counters can be changed at variable rates speedily and accurately, the device of the present invention is ideally suited for the speedy and accurate positioning of the cursor 35.

Although the novel device of the present invention provides significant advantages in the speedy and accurate positioning of a cursor on a display under computer control, its use is not limited thereto. If desired, the computer may output the numerical contents or numbers of selected memory cells to counters 22X and 22Y on lines 41 and 42. These numbers would then be displayed on displays 25X and 25Y. The operator, by means of joystick 12, may change these numbers and thereafter store the new numbers of the counters in the computer, thereby updating the numbers in the particular memory cells. Such an arrangement enables the operator to interact with the computer to update the contents of any of its memory cells accurately and speedily by means of the novel device of the present invention.

It should further be appreciated by those familiar with the art that the novel device can be utilized with other than a computer. For example, the outputs of counters 22X and 22Y may be supplied directly to a display unit, such as unit 32, to control the cursor position. Another possible use is in connection with an XY plotter in which the outputs of the counters' contents may be used to control the pen position. Generally, the novel device of the present invention can be used to control the position of an element, whose relative position with respect to a reference point is definable by two numbers. One of the primary novel features of the present invention is the ability to control the rate or rates of clock pulses as a function of the displacement of a manually positionable element, such as a joystick, and thereby speedily yet accurately control the rate of change and the final numerical contents of registers such as counters 22X and 22Y.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. For use with a computer, a computer peripheral device for manually updating the numerical content of the computer, comprising:

a joystick defining a quiescent reference position and being manually pivotable from said reference position so as to be displaced in either first or second opposite directions along each of first and second orthogonal axes;

sensing means coupled to said joystick for providing at four distinct output terminals of said sensing means first, second, third and fourth control signals, whose amplitudes are respectively functions of the magnitudes of displacement of said joystick in said first and second directions along said first axis and in said first and second directions along said second axis;

a first source responsive to either of said first and second control signals for providing pulses at a rate which is a function of the magnitude of the displacement of said joystick in said first axis;

a second source responsive to either of said third and fourth control signals, for providing pulses at a rate which is a function of the magnitude of the displacement of said joystick in said second axis;

a first reversible counter for counting the pulses received from said first source;

a second reversible counter for counting the pulses received from said second source;

control means responsive to said control signals for controlling said first counter to respectively increment and decrement the count therein with the pulses from said first source when said joystick is displaced in said first and second directions along said first axis, and for controlling said second counter to respectively increment and decrement the count therein with the pulse from said second source when said joystick is displaced in said first and second directions along said second axis, whereby the numerical contents of said first and second counters are functions of the manual displacements of said joystick;

means for supplying the numerical contents of said first and second counters to said computer; and display means for visually displaying the numerical contents of said first and second counters.

2. In a device as described in claim 1 further including means for coupling said first and second counters to said computer to initialize the numerical contents of said counters by said computer.

3. In combination with a system responsive to the numerical contents of counters, a peripheral device for manually controlling the numerical contents supplied to said system, comprising:

a joystick defining a quiescent reference portion and being manually pivotable from said reference position so as to be displaced in either first or second opposite directions along first and second orthogonal axes;

a first source for providing pulses at a rate which is a function of the displacement of said joystick in said first axis;

a second source for providing pulses at a rate which is a function of the displacement of said joystick in said second axis;

a first reversible counter for counting the pulses received from said first source;

a second reversible counter for counting the pulses received from said second source;

control means for controlling said first counter to respectively increment and decrement the count therein with the pulses from said first source when said joystick is displaced in said first and second directions along said first axis, and for controlling said second counter to respectively increment and decrement the count therein with the pulses from said second source when said joystick is displaced in said first and second directions along said second axis, whereby the numerical contents of said first and second counters are functions of the manual displacements of said joystick;

means for supplying the numerical contents of said first and second counters to said system, said system being a display system including a cursor movable thereon from a reference point, with the numerical contents of said counters being used by said system to control the position of said cursor along two orthogonal axes with respect to said reference point; and display means for visually displaying the numerical contents of said first and second counters, to thereby provide a visual indication of the distance of said cursor from said reference point along the two orthogonal axes.

* * * * *